United States Patent [19]
Beck

[11] Patent Number: 6,008,599
[45] Date of Patent: Dec. 28, 1999

[54] METHOD AND APPARATUS FOR CONTROLLING AN ELECTRIC ASSIST MOTOR

[75] Inventor: Martin E. Beck, Manhattan Beach, Calif.

[73] Assignee: TRW Inc., Lyndhurst, Ohio

[21] Appl. No.: 08/710,742

[22] Filed: Sep. 20, 1996

Related U.S. Application Data

[63] Continuation of application No. 08/334,231, Nov. 4, 1994, abandoned.

[51] Int. Cl.$^6$ ...................................................... H02K 23/00
[52] U.S. Cl. .......................... 318/254; 318/701; 318/599; 180/446; 388/811
[58] Field of Search ..................................... 318/811, 802, 318/254, 701; 388/811, 829; 180/443–446

[56] References Cited

U.S. PATENT DOCUMENTS

| | | |
|---|---|---|
| 4,293,807 | 10/1981 | Foster et al. . |
| 4,368,411 | 1/1983 | Kidd ......................... 318/254 |
| 4,532,567 | 7/1985 | Kode ................... 318/434 X |
| 4,562,393 | 12/1985 | Loyzim et al. . |
| 4,581,565 | 4/1986 | Van Pelt et al. ......... 318/294 |
| 4,660,671 | 4/1987 | Behr et al. . |
| 4,782,272 | 11/1988 | Buckley et al. . |
| 4,956,590 | 9/1990 | Phillips ..................... 318/432 |
| 4,980,838 | 12/1990 | Daggatt et al. ...... 318/599 X |
| 4,989,683 | 2/1991 | Morishita ............. 318/599 X |
| 5,075,608 | 12/1991 | Erdman et al. . |
| 5,156,005 | 10/1992 | Redlich ................ 318/811 X |
| 5,166,591 | 11/1992 | Stephens et al. ......... 318/701 |
| 5,257,828 | 11/1993 | Miller et al. ............ 180/446 |
| 5,260,645 | 11/1993 | Williams et al. . |
| 5,379,209 | 1/1995 | Goff .................... 318/599 X |
| 5,444,622 | 8/1995 | Takeshima et al. ....... 18/446 |
| 5,621,292 | 4/1997 | Kokura et al. ........... 318/599 |

FOREIGN PATENT DOCUMENTS

| | | |
|---|---|---|
| 6144279 | 5/1994 | Japan . |
| 9013465 | 11/1990 | WIPO . |

OTHER PUBLICATIONS

An abstract of Japanese Application No. JP 2095976 dated Apr. 6, 1990.

*Primary Examiner*—David Martin
*Attorney, Agent, or Firm*—Tarolli, Sundheim, Covell, Tummino & Szabo LLP

[57] ABSTRACT

An apparatus for controlling an electric assist steering system (10) having an electric assist motor (26) operatively connected to a steerable member. Energization of the motor provides steering assist to the steering member. The apparatus includes a steering torque sensor (27) for sensing applied steering torque and providing a torque signal indicative thereof. A first switching device (72) is operative coupled between one terminal of the electric assist motor (26) and a first terminal of a source of electrical energy. A second switching device (98) is operative coupled between a second terminal of the electric assist motor and a second terminal of the source of electrical energy. A controller (76) periodically switches the first and second switching devices between ON and OFF conditions so that the ON condition of each the first and second switching devices is less than one-hundred percent of a period and a portion of the ON condition of the first and second switching devices overlap. Electrical current flows through the electric assist motor (26) during an overlap portion of ON conditions. The amount of the overlap controls current in the electric assist motor. The controller (76) controls the overlap in response to the sensed applied steering torque.

40 Claims, 5 Drawing Sheets

METHOD AND APPARATUS FOR CONTROLLING AN ELECTRIC ASSIST MOTOR

This application is a continuation of application Ser. No. 08/334,231 filed on Nov. 4, 1994 now abandoned.

TECHNICAL FIELD

The present invention is directed to an electric assist steering system and is particularly directed to a method and apparatus for controlling energization of an electric assist motor in a steering system.

BACKGROUND OF THE INVENTION

There are many known power assist steering systems for automotive vehicles. Some provide steering assist by using hydraulic power and others by using electric power.

Electric assist steering systems include an electric motor drivably connected to the steerable vehicle wheels. When energized, the electric motor assists the steering movement of the steerable wheels. The electric assist motor is controlled in response to steering torque applied to the steering wheel.

Known electric assist steering systems typically include a D.C. permanent magnet electric assist motor electrically energized through an H-bridge drive circuit. One such drive arrangement is disclosed in U.S. Pat. No. 4,660,671 to Behr et al., an assigned to TRW Inc. In this arrangement, the H-bridge includes four field-effect-transistors ("FET's") connected in the "H" pattern. The electric assist motor is energized by turning one of the FET's continuously ON and pulse-width-modulating ("PWM") the diagonally opposed FET of the H-bridge. Current is controlled by varying the duty cycle of the PWM signal. The direction of current through the motor controls the direction in which the motor will rotate and, in turn, controls the steering direction.

It is desirable to use a variable reluctance motor in an electric assist steering system because of its small size, low friction, and its high torque-to-inertia ratio. The direction of rotation of a variable reluctance motor is controlled by controlling the sequence in which the stator windings are energized. Torque is controlled by controlling the amount of current through the stator windings. Accurate current control is necessary to produce low ripple torque, thereby reducing vibration felt at the steering wheel. One control arrangement for a variable reluctance electric assist motor is disclosed in U.S. Pat. No. 5,257,828 to Miller et al., and assigned to TRW Inc., and which is hereby fully incorporated herein by reference. The '828 patent controls current in the assist motor by pulse-width-modulating a series connected solid state switch.

As with systems using DC electric motors, fly-back current in systems using a variable reluctance motor is typically controlled through fly-back diodes. The fly-back diodes provide a current path for the fly-back current that results from the collapsing magnetic field of a recently de-energized stator coil.

Also of concern in an electric assist steering system is the operating temperature of the switching devices used to control the current through the electric assist motor. The above-mentioned Behr et al. '671 patent discloses a temperature sensing arrangement that folds back the PWM control signal if the temperature of the switching FET's exceeds a predetermined value. Also, a current sense arrangement senses current through the motor and folds back current if the sensed current exceeds a predetermined current threshold value.

A further concern of an electric assist steering system is the operational integrity of the system. The '671 patent also teaches several self-diagnostic features of the system. These diagnostic features include a torque signal absolute limit test, a summed torque signal test, an excessive PWM test, and a direction test.

SUMMARY OF THE INVENTION

The present invention provides a method and apparatus for controlling an electric assist steering system that includes an improved current sensing ability, reduces the number of components needed in the drive control circuit, and improves thermal management of switching devices used to control current through the electric assist motor.

In accordance with the present invention, an apparatus is provided for controlling an electric motor. The apparatus includes a first switching device operatively coupled between one terminal of the electric motor and a first terminal of a source of electrical energy, and a second switching device operatively coupled between a second terminal of the electric motor and a second terminal of the source of electrical energy. The apparatus further includes control means for controlling energization of the electric motor. The control means includes means for periodically switching the first and second switching devices between ON and OFF conditions so that the ON condition of each the first and second switching devices is less than one-hundred percent of a period and a portion of the ON condition of the first and second switching devices overlap. Electrical current flows through the electric motor during an overlap portion of ON conditions. The amount of the overlap controls current in the electric motor. The control means includes means for controlling the overlap.

In accordance with another aspect of the present invention, an apparatus is provided for controlling an electric assist steering system having an electric assist motor operatively connected to a steerable member. Energization of the motor provides steering assist to the steering member. The apparatus further includes torque sensing means for sensing applied steering torque and providing a torque signal indicative thereof. The apparatus further includes a first switching device operatively coupled between one terminal of the electric assist motor and a first terminal of a source of electrical energy and a second switching device operatively coupled between a second terminal of the electric assist motor and a second terminal of the source of electrical energy. Control means are provided for controlling energization of the electric assist motor. The control means includes means for periodically switching the first and second switching devices between ON and OFF conditions so that the ON condition of each the first and second switching devices is less than one-hundred percent of a period and a portion of the ON condition of the first and second switching devices overlap. Electrical current flows through the electric assist motor during an overlap portion of ON conditions of the switching devices. The amount of the overlap controls current in the electric assist motor. The control means includes means for controlling the overlap in response to the sensed applied steering torque.

Preferably, the electric assist motor is a variable reluctance motor. The control means preferably includes means for pulse-width-modulating both the first and second switching devices to the ON and OFF conditions. A first fly-back diode is connected between the second motor terminal and the first terminal of the source of electrical energy and a second fly-back diode is connected between the first motor terminal and the second terminal of the source of electrical energy. The control means includes ramp generating means for providing a ramp signal, means for comparing the ramp signal against first and second error reference signals, means for sensing current through the electric assist motor and providing a signal indicative thereof, and means for controlling the value of the first and second error reference signals in response to the sensed current. The means for pulse-width-modulating each of the first and second switching devices is response to the comparison. The control means further includes means for comparing the first and second error reference signals against first and second absolute reference values, respectively, and means for disabling the electric assist system if either the first and second error reference signal exceed their associated first and second absolute reference value.

In accordance with another aspect of the present invention, a method of controlling an electric motor comprises the steps of providing a first switching device operative coupled between one terminal of the electric motor and a first terminal of a source of electrical energy, and providing a second switching device operative coupled between a second terminal of the electric motor and a second terminal of the source of electrical energy. Energization of the electric motor is controlled by (a) periodically switching the first and second switching devices between ON and OFF conditions so that the ON condition of each the first and second switching devices is less than one-hundred percent of a period and a portion of the ON condition of the first and second switching devices overlap, electrical current flowing through the electric motor during an overlap portion of ON conditions of the switching devices, the amount of the overlap of the ON conditions controlling current in the electric motor, and (b) controlling said overlap.

BRIEF DESCRIPTION OF THE DRAWINGS

Other features and advantages of the present invention will become apparent to those skilled in the art to which the present invention relates from reading the following detailed description with reference to the accompanying drawings, in which.

DESCRIPTION OF PREFERRED EMBODIMENT

Figure 1:
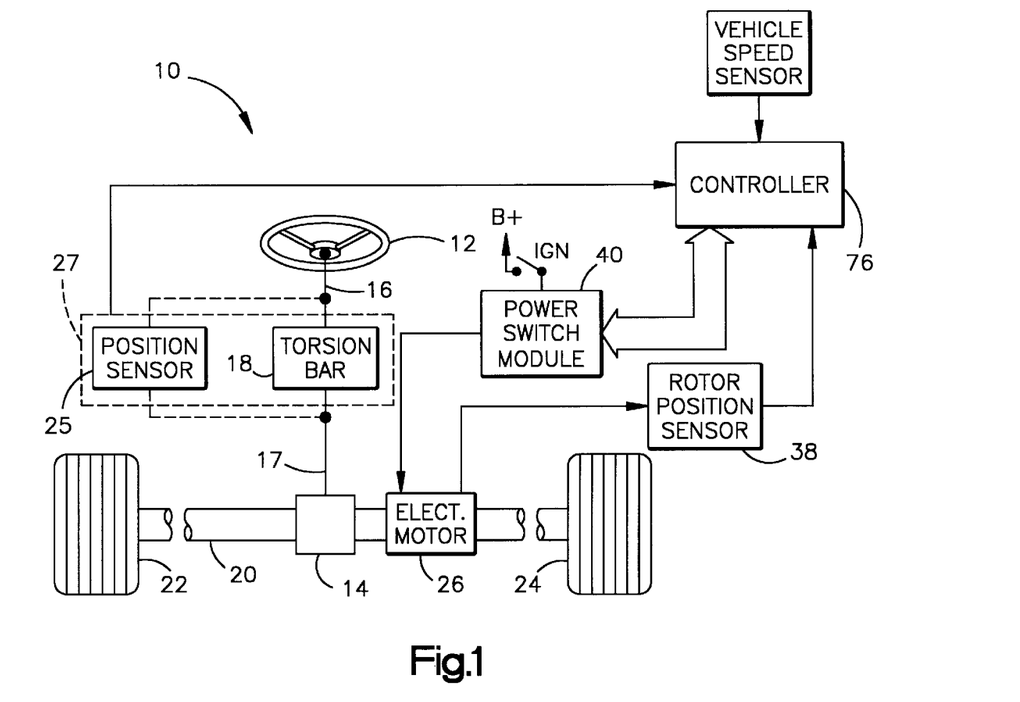
FIG. 1 is a schematic block diagram of an electric assist steering system made in accordance with the present invention.

Referring to FIG. 1, an electric assist steering system 10 includes a steering wheel 12 operatively connected to a pinion gear 14. Specifically, the vehicle steering wheel 12 is connected to an input shaft 16 and the pinion gear 14 is connected to a pinion shaft 17. The input shaft 16 is operatively coupled to the pinion shaft 17 through a torsion bar 18. The torsion bar 18 twists in response to applied steering torque thereby permitting relative rotation between the input shaft 16 and the pinion shaft 17. The amount of relative rotation is functionally related to the torsion bar strength and the amount of applied steering torque. Stops, not shown, operative between the input shaft 16 and the pinion shaft 17 limit the amount of such relative rotation between the input and pinion shafts in a manner well known in the art.

The pinion gear 14 has helical teeth which are meshingly engaged with straight cut teeth on a rack or linear steering member 20. The pinion gear in combination with the straight cut gear teeth on the rack member form a rack and pinion gear set. The rack 20 is steerably coupled to the vehicle's steerable wheels 22, 24 with steering linkage in a known manner. When the steering wheel 12 is turned, the rack and pinion gear set converts the rotary motion of the steering wheel into linear motion of the rack. When the rack moves linearly, the steerable wheels 22, 24 pivot about their associated steering axis and the vehicle is steered.

A shaft position sensor 25 is operatively connected across the input shaft 16 and the pinion shaft 17 and provides an electrical signal having a value indicative of the relative rotational position between the input shaft 16 and the output shaft 17. The shaft position sensor 25 in combination with the torsion bar 18 form a torque sensor 27. The output of the torque sensor 27 is indicative of the applied steering torque to the vehicle steering wheel 12 by the vehicle operator.

The output of the torque sensor 27 is connected to a controller 76. The controller 76 processes the torque signal provided by the torque sensor 27, and determines, in accordance with any one of the many methods known in the art, a torque command and direction value therefrom. Preferably, the torque command and direction signal is determined in accordance with the process described in the above-incorporated U.S. Pat. No. 5,257,828 to Miller et al. The torque command and direction value represents the amount and direction of torque to be generated by an assist motor 26.

An electric assist, variable reluctance motor 26 is drivingly connected to the rack 20 preferably through a ball-nut drive arrangement. When the motor 26 is energized, it provides steering assist to aid in the rotation of the vehicle steering wheel 12 by the vehicle operator and, in turn, steering of the steerable wheels 22, 24. A variable reluctance motor is desirable for use in an electric assist steering system because of its small size, low friction, and its high torque-to-inertia ratio.

Figure 2:
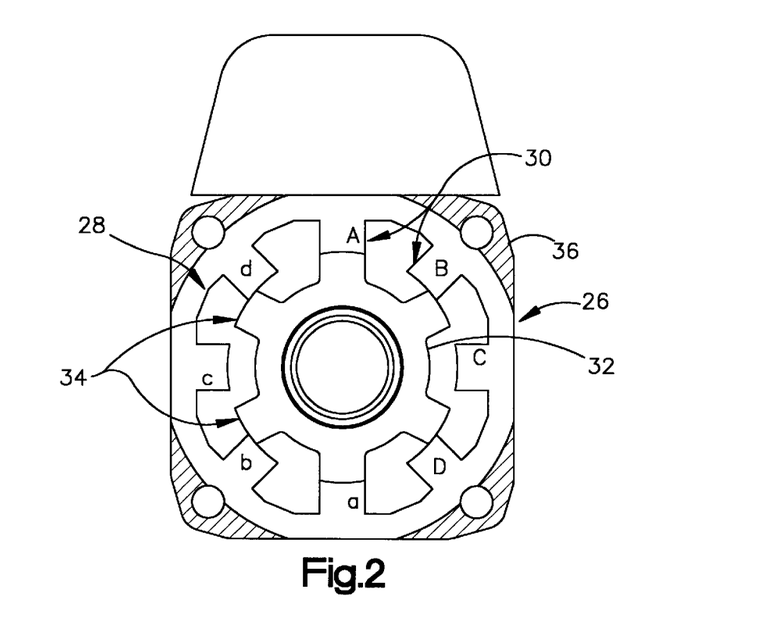
FIG. 2 is a cross-sectional view of the variable reluctance electric assist motor shown in FIG. 1.

Referring to FIG. 2, the variable reluctance motor 26, in accordance with a preferred embodiment of the present invention, includes a stator 28 with eight stator poles 30 and a rotor 32 with six rotor poles 34. Each stator pole 30 has an associated stator coil (not shown). The stator poles are arranged so as to be energized in pairs designated Aa, Bb, Cc, and Dd thereby resulting in four stator pole pairs and six rotor poles 34. The motor 26 is mounted in a motor housing 36 so that the stator 28 is fixed relative to the housing 36.

The principle of operation of a variable reluctance motor is well known in the art. Basically, the stator poles are energized in pairs. Specifically, electric current is provided to the stator coils associated with a given pair of stator poles. The rotor moves so as to minimize the reluctance between the energized stator poles and the rotor poles. Minimum reluctance occurs when a pair of rotor poles are aligned with the energized stator poles. Once minimum reluctance is achieved, i.e., when the rotor poles align with the energized stator poles, those energized stator poles are de-energized and an adjacent pair of stator poles are energized. The direction of motor rotation is controlled by controlling the sequence in which the stator poles are energized. The torque produced by the motor is controlled by controlling the amount of current through the energized stator coils.

Referring to FIG. 1, a rotor position sensor 38 is operatively connected between the motor rotor 32 and the motor stator 28 or housing 36. The stator 28 and motor housing 36 are relatively stationary. The function of the rotor position sensor 38 is to provide an electrical signal indicative of the position of the rotor 32 relative to the motor stator 28. For control of the operation of the variable reluctance motor 26, including direction of rotation and motor torque, it is necessary to know the position of the rotor 32 relative to the stator 28. One arrangement for sensing rotor position in a variable reluctance motor in an electric assist steering system is fully disclosed in the above-incorporated U.S. Pat. No. 5,257,828 to Miller et al.

A controller 76 is operatively connected to the torque sensor 27, to the motor position sensor 38, and to a power switch module 40. The power switch module 40 is operatively connected between the vehicle battery and the electric assist motor 26. The controller 76 controls the energization sequence of the stator pole pairs Aa, Bb, Cc and Dd (FIG. 2) to control motor direction in response to the direction of applied steering torque and motor position. The controller 76 controls the current in the stator windings in response to the amount of applied steering torque.

Figure 3:
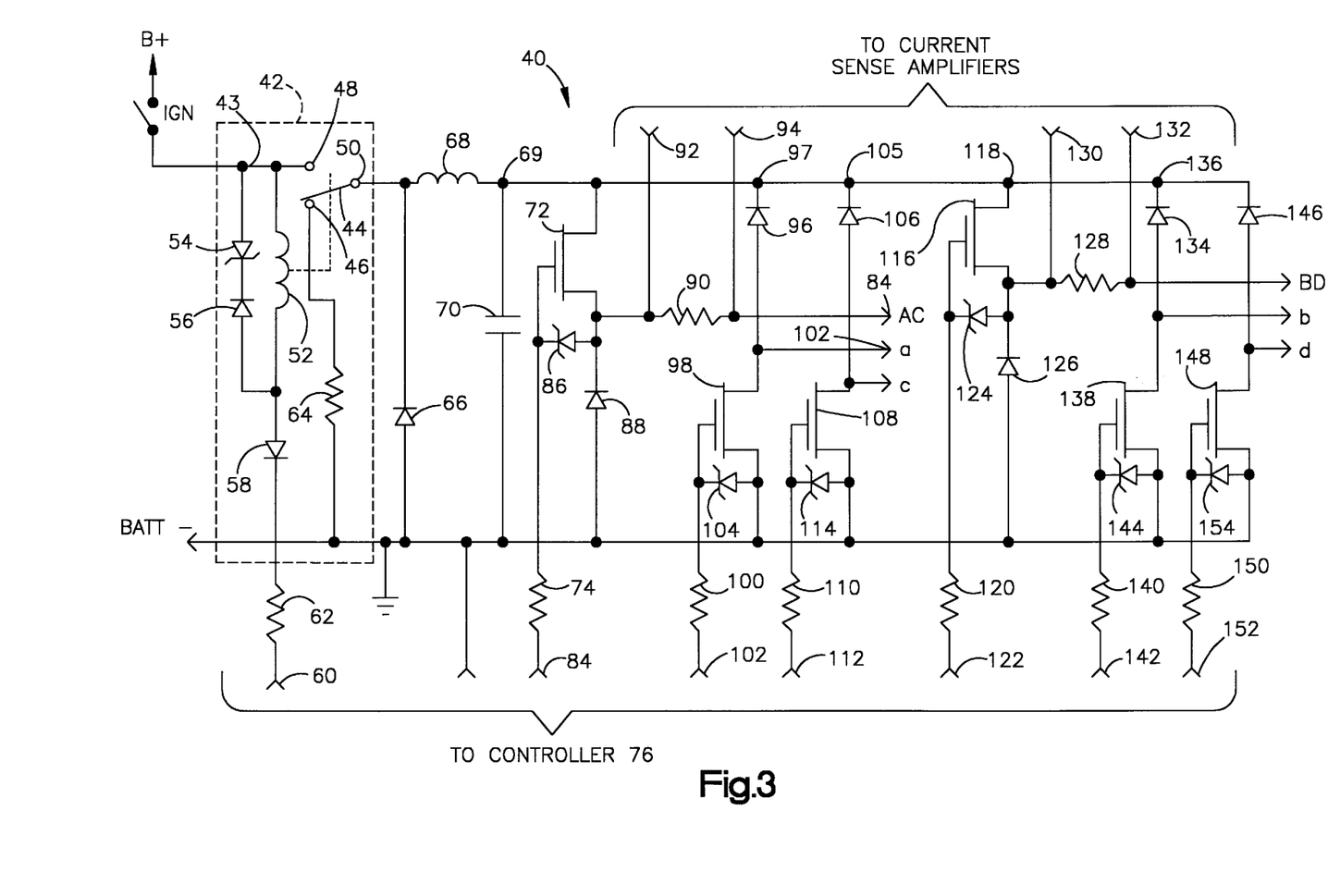
FIG. 3 is a schematic illustration of the power switch module shown in FIG. 1.

Referring to FIG. 3, the power switch module 40 includes a normally open electromagnetic relay circuit 42 having a terminal 43 of a relay coil 52 electrically connected to the positive supply of a vehicle's battery through the vehicle's ignition switch. The anode of a Zener diode 54 is connected to coil 52 at terminal 43. The cathode of Zener diode 54 is connected to the cathode of a diode 56. When coil 52 is de-energized, the collapsing magnetic field creates a reverse polarity inductive current. The Zener breakdown voltage of Zener diode 54 is selected to provide a current path for the reverse polarity current due to the collapsing magnetic field. This permits the relay 42 to switch open faster. The anode of diode 56 is connected to the other terminal of coil 52. The junction formed by coil 52 and diode 56 is connected to the anode of a diode 58. The cathode of diode 58 is connected to a terminal 60 of controller 76 through a resistor 62.

When the controller 76 outputs a LOW on terminal 60, the relay coil 52 is energized which closes the normally open switch 44. When switch 44 is closed, the remainder of the power switch module 40 is energized. To remove power from the power switch module 40, the controller 76 outputs a voltage sufficiently high to de-energize the coil 52 thereby opening switch 44. The controller 76 performs several system diagnostic tests. Upon the detection of a fault condition, the controller de-energizes the coil 52 so that the steering system reverts to manually steering without assist.

Terminal 46, the de-energized position for switch 44, is connected to electrical ground through a resistor 64. The current path through resistor 64 provides a return path for current in power switch module 40 when the relay 42 is de-energized. The cathode of a diode 66 is connected to terminal 50 and the anode of diode 66 is connected to electrical ground. Diode 66 provides a current fly-back path to prevent arcing in relay 42 when switched open. An inductor 68 has one terminal connected to terminal 50. The other terminal of inductor 68 is connected to one terminal of a capacitor 70. The other terminal of capacitor 70 is connected to electrical ground. The inductor 68 and the capacitor 70 form an LC filter, the function and operation of which is well known in the art.

A junction 69 of inductor 68 and capacitor 70 is connected to the drain of a solid state power switching device 72 and is electrically connected to the vehicle's battery through relay 42 when relay 42 is energized. The gate of switching device 72 is electrically connected to a terminal 84 of controller 76 through a resistor 74. The cathode of an over-voltage protection Zener diode 86 is electrically connected to the gate of switching device 72. The anode of diode 86 is connected to the source of switching device 72. The cathode of a fly-back diode 88 is connected to the source of switching device 72. The anode of fly-back diode 88 is connected to electrical ground. One terminal of a current sense resistor 90 is connected to the source of switching device 72 and to a test terminal 92. The other terminal of current sense resistor 90 is connected to both of the motor windings A and C (shown in FIG. 2.) and to a test voltage terminal 94.

The four motor pole pairs, when energized, are connected to the positive battery voltage and to the negative battery terminal (also referred to as electrical ground) through solid state switching devices. The terminals of the pole pairs that are connectable to the positive battery terminals are referred to herein as the HIGH side terminals. The terminals of the pole pairs that are connectable to the negative battery terminals or electrical ground are referred to herein as the LOW side terminals. Therefore, the other terminal of current sense resistor 90 is connected to both of the HIGH side motor windings A and C.

Since only one of the stator poles A or C is energized at a time, a common HIGH side solid state power switching device 72 and a common HIGH side current sense resistor 90 may be used to provide current to both stator pole pairs Aa and Cc and a means to monitor the current in both stator pole pairs. Each LOW side stator winding for stator poles a and c is individually connectable to electrical ground through an associated solid state power switching device. A solid state power switching device 98 is connected between stator pole a and electrical ground. Solid state power switching device 108 is connected between stator pole c and electrical ground.

The cathode of a fly-back diode 96 is electrically connected to the vehicle's battery at a junction 97 and through relay 42. The anode of diode 96 is connected to the LOW side motor winding of stator pole a and to the drain of solid state power switching device 98. The gate of switching device 98 is electrically connected to a terminal 102 of controller 76 through a resistor 100. The cathode of an over-voltage protection Zener diode 104 is electrically connected to the gate of switching device 98. The anode of diode 104 is connected to the source of switching device 98. The source of switching device 98 is connected to electrical ground.

The cathode of a fly-back diode 106 is electrically connected to the vehicle's battery at a junction 105 through relay 42. The anode of diode 106 is connected to the LOW side motor winding for stator pole c and to the drain of a solid state power switching device 108. The gate of switching device 108 is electrically connected to a terminal 112 of controller 76 through a resistor 110. The cathode of an over-voltage protection Zener diode 114 is electrically connected to the gate of switching device 108. The anode of diode 114 is connected to the source of switching device 108. The source of switching device 108 is connected to electrical ground.

The drain of a solid state power switching device 116 is electrically connected to the vehicle's battery at a junction 118 through relay 42. The gate of switching device 116 is electrically connected to a terminal 122 of controller 76 through a resistor 120. The cathode of an over-voltage protection Zener diode 124 is electrically connected to the gate of switching device 116. The anode of diode 124 is connected to the source of switching device 116. The cathode of a fly-back diode 126 is connected to the source of switching device 116. The anode of fly-back diode 126 is connected to electrical ground. One terminal of a current sense resistor 128 is connected to the source of switching device 116 and to a test voltage terminal 130. The other terminal of current sense resistor 128 is connected to the HIGH side motor windings for the stator poles B and D (shown in FIG. 2.) and to a test voltage terminal 132.

Since only one of the two HIGH side stator windings, for stator poles B or D is energized at a time, a common HIGH side solid state power switching device 116 and a common HIGH side current sense resistor 128 may be used to provide current to the stator pole pairs Bb and Dd and a means for monitoring the current in both stator pole pairs. Each LOW side stator winding for stator poles b and d is individually connectable to electrical ground through an associated solid state power switching device. A solid state power switching device 138 can connect the winding of stator pole b to ground and a solid state power switching device 148 can connect the winding of stator pole d to ground.

The cathode of a fly-back diode 134 is electrically connected to the vehicle's battery at a junction 136 through relay 42. The anode of diode 134 is connected to the LOW side motor winding for stator pole b and to the drain of solid state power switching device 138. The gate of switching device 138 is electrically connected to a terminal 142 of controller 76 through a resistor 140. The cathode of an over-voltage protection Zener diode 144 is electrically connected to the gate of switching device 138. The anode of diode 144 is connected to the source of switching device 138. The source of switching device 138 is connected to electrical ground.

The cathode of a fly-back diode 146 is electrically connected to a vehicle's battery at junction 136 through relay 42. The anode of diode 146 is connected to the LOW side motor winding of stator pole d and to the drain of solid state power switching device 148. The gate of switching device 148 is electrically connected to a terminal 152 of the controller 76 through a resistor 150. The cathode of an over-voltage protection Zener diode 154 is electrically connected to the gate of switching device 148. The anode of diode 154 is connected to the source of switching device 148. The source of switching device 148 is connected to electrical ground.

Referring to FIGS. 4–10, control of the electric assist motor, in accordance with the present invention, will be better appreciated. For the purpose of explanation, only energization of a single pair of stator motor windings Aa 149 is discussed. It is to be understood that energization control of the other motor windings is the same.

A vehicle speed sensor 143 is connected to controller 76. Controller 76 determines a motor current command 149 in response to applied steering torque, vehicle speed, and motor position in a manner fully described in the above-incorporated '828 patent. The controller develops a current command signal 145 in response to the determined motor command. The current command signal 145 has a value indicative of the amount of electric current that must be applied to the electric assist motor for the motor to produce sufficient torque assist in response to the amount of applied steering torque, vehicle speed, and motor position. Those skilled in the art will appreciate that the current command signal 145 is preferably functionally related to vehicle speed so that steering assist decreases as vehicle speed increases. Also, the current command is preferably functionally related to the speed of the assist motor so that the system will have an increased yaw stability. Assist motor speed is determined from the motor position sensor 38. These and other control parameters are fully described in the above-incorporated '828 patent. The present invention is directed to energization of the motor in response to the current command signal independent of parameters used to develop the current command signal.

Figure 4:
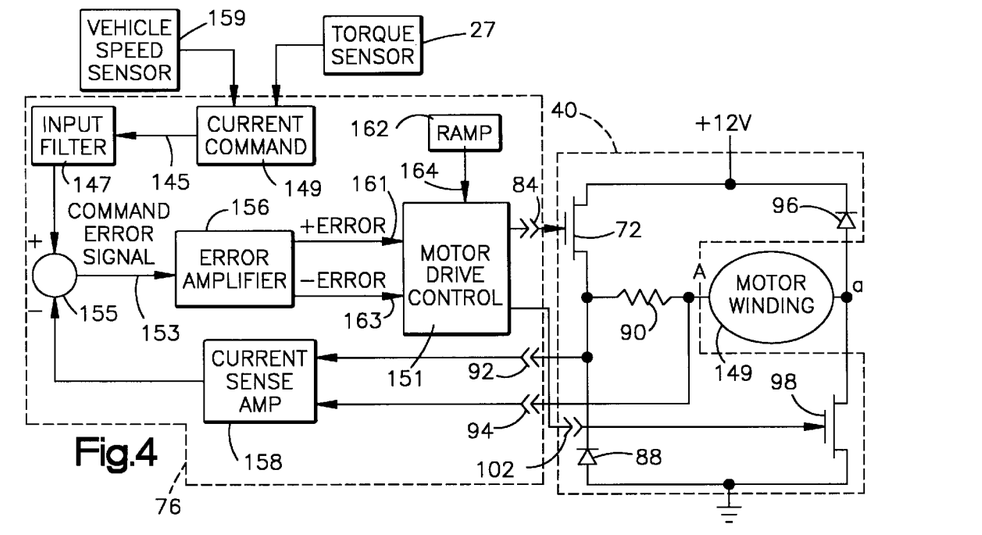
FIG. 4 is a schematic block diagram of a portion of the system of FIG. 1 shown in further detail.

The current command signal 145 is filtered by an input filter 147 and provided to the positive input of a summing circuit 155 (FIG. 4). Test voltage terminals 92, 94 provide voltage values appearing at the terminals of current sense resistor 90 as inputs to a current sense amplifier 158. Current sense amplifier 158 is a differential amplifier which provides a signal indicative of the voltage drop across the resistor 90. The output of amplifier 158 is indicative of the current through motor stator winding Aa. The output of current sense amplifier 158 provides a negative feedback signal as a second input to summing circuit 155. Summing circuit 155 sums the negative feedback signal from current sense amplifier 158 with the current command signal and outputs a command error signal 153. The command error signal 153 from summing circuit 155 is provided as an input to an error amplifier 156.

Figure 5:
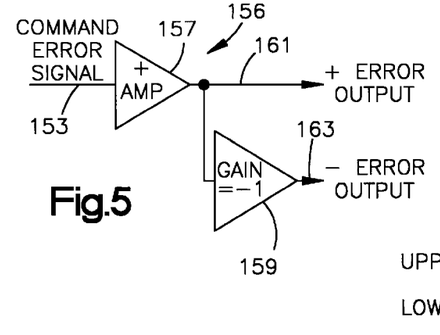
FIG. 5 is a schematic block diagram of the error amplifier shown in FIG. 4.

Referring to FIG. 5, the operation of error amplifier 156 will be better appreciated. A positive error amplifier 157 amplifies the command error signal 153 from summing circuit 155. Positive error amplifier 157 provides a plus error output signal 161. The plus error output signal 161 is connected to (i) an input to a motor drive control 151 and (ii) an input signal to a negative error amplifier 159. Negative error amplifier 159 has a gain of (−1). The output of negative error amplifier 159 is a minus error output signal 163. The minus error output signal 163 is connected to a second input of motor drive control 151.

The algebraic sign of the error signals 161, 163 may be either a positive or negative value, depending upon the sign of the command error signal 153 output from summing circuit 155. The sign of command error signal 153 is dependant upon (i) the magnitude of the voltage sensed across current sense resistor 90 and, (ii) the magnitude of the current command signal. If the command error signal 153 is a positive value, the plus error signal 161 has a positive value and the minus error signal 163 has a negative value. The converse is also true; a negative value for the command error signal 153 produces a negative value for the plus error signal 161 and a positive value for the minus error signal 163. A negative error command signal occurs when the motor winding has residual current from the collapsing magnetic field. This occurs when the winding is first de-energized and there is a falling current command signal provided to the positive input of summing circuit 155. Therefore, both the plus error signal 161 and the minus error signal 163 may have either a positive or negative algebraic value.

Figure 10:
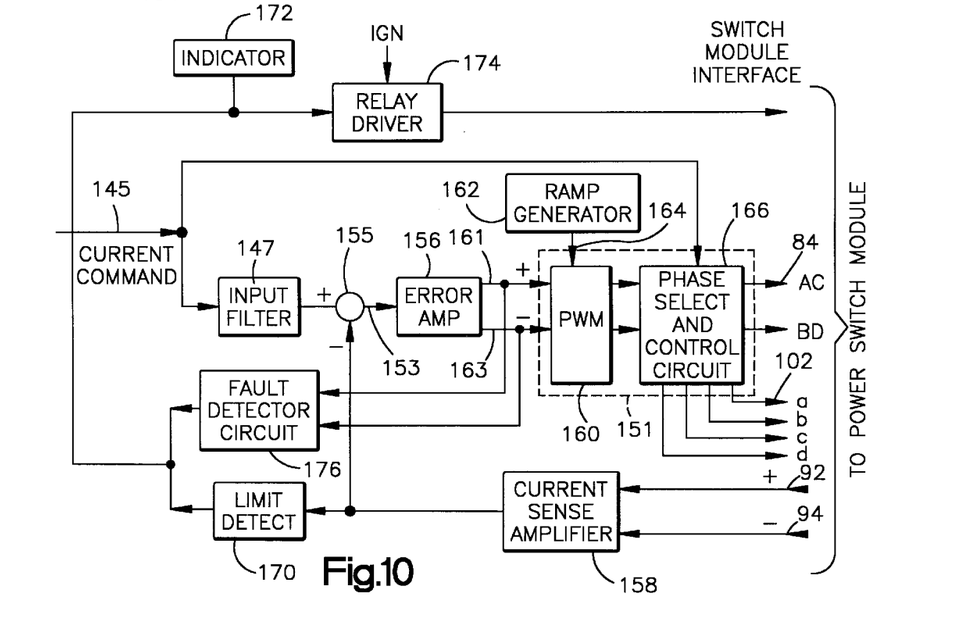
FIG. 10 is a schematic block diagram similar to FIG. 4 of a portion of the controller shown in FIG. 1 in greater detail.

Referring to FIG. 10, the two output signals 161, 163 of error amplifier 156 are connected to motor drive control 151. A ramp generator 162 has an output 164 operatively connected to a pulse-width-modulator 160 in motor drive control 151. Ramp generator 162 is designed to provide a ramp output having an amplitude proportional to the supply voltage, B+, which also provides power to the power switch module 40.

Figure 13:
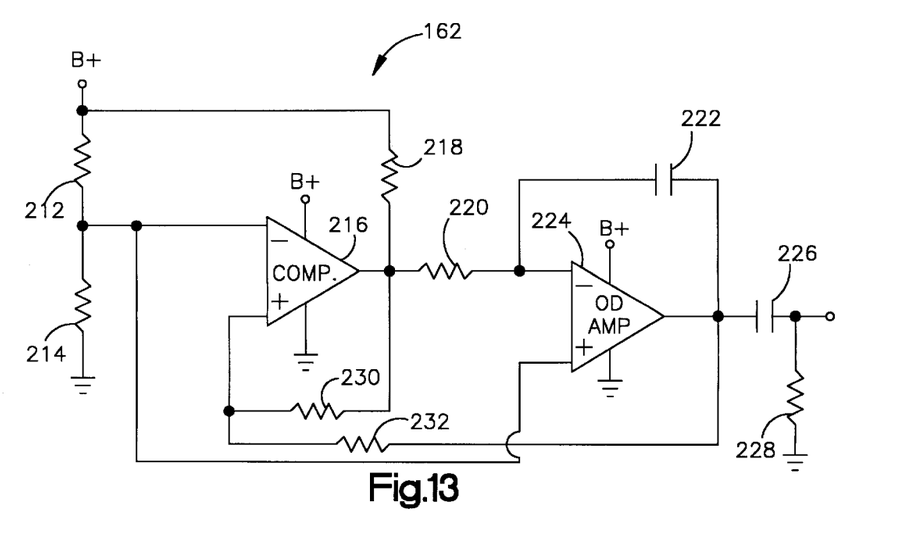
FIG. 13 is a schematic diagram of the ramp circuit shown in FIGS. 4 and 10.

Referring to FIG. 13, ramp generator 162 which produces a triangle ramp signal will be better appreciated. A resistor 212 has one terminal connected to a source of electric energy, B+, and the other terminal connected to a resistor 214. The other terminal of resistor 214 is connected to electrical ground. Resistors 212, 214 are approximately equal in resistance value and form a voltage divider network. The junction formed by resistors 212 and 214 provides a reference voltage value to the negative input of a comparator 216. The output of comparator 216 is connected to one terminal of a pull-up resistor 218. The other terminal of pull-up resistor 218 is connected to the source of electric energy B+. A resistor 230 has one terminal connected to the output of comparator 216 and the other terminal to the positive input of comparator 216. A resistor 220 has one terminal connected to the output of comparator 216 and the other terminal connected to the negative input of an operational amplifier 224. A capacitor 222 has one terminal connected to the output of operational amplifier 224 and the other terminal connected to the negative input of operational amplifier 224. A resistor 232 has one terminal connected to the output of operational amplifier 224 and the other terminal connected to the positive input of comparator 216. A capacitor 226 has one terminal connected to the output of operational amplifier 224 and the other terminal connected to pulse-width-modulator 160 (FIG. 10) and a bias current source resistor 228. Capacitor 226 capacitively couples ramp generator 162 to pulse-width-modulator 160, producing a ramp signal which is symmetrical around zero volts. The positive input of operational amplifier 224 is connected to the junction formed between resistors 212 and 214.

To understand the operation of ramp generator 162, assume that the output of comparator 216 is presently HIGH. Pull-up resistor 218 provides current from the electrical source B+ to resistor 220. The current through resistor 220 is proportional to the voltage of electrical source B+. Operational amplifier 224 provides whatever voltage is required to keep the current flowing in resistor 220 and the current flowing in capacitor 222 equal in value. The voltage output from operational amplifier 224 ramps down to maintain equal currents in resistor 220 and capacitor 222. The ramping down voltage value output from operational amplifier 224 is fed back to the positive input of comparator 216 through resistor 232. Resistors 230, 232 form a voltage dividing network. As the voltage output from operational amplifier 224 continues to ramp down, it eventually decreases to a low enough value that the output of comparator 216 switches state to LOW. The resistance of pull-up resistor 218 is small compared to the values of resistors 230, 232. In effect, since the value of pull-up resistor is small compared to resistor 230 and 232, voltage B+ is applied to the "high side" of both voltage divider networks 212, 214 and 230, 232 at the terminals of resistors 212 and 230. The "low side" of resistor 214 is connected to electrical ground and the "low side" of resistor 232 is connected to the output of operational amplifier 224, which is effectively near zero volts.

The resistance value of resistor 230 is greater than the resistance value of resistor 232. Preferably resistor 230 is double the resistance of resistor 232. This permits the voltage divider network 230, 232 to deliver a voltage value to the positive input of comparator 216 less than the voltage value at the negative input to cause comparator 216 to change states. Once comparator 216 changes state to output a LOW, the current in resistor 220 and capacitor 222 reverses. The voltage output of operational amplifier 224 now ramps up to keep the current flow in capacitor 222 and resistor 220 equal. As the output voltage ramps up, the voltage applied to the positive input of comparator 216 rises. When the voltage value at the positive input of comparator 216 becomes greater than the input voltage to the negative input terminal, the output of comparator 216 switches state to output a HIGH.

It will be appreciated by one skilled in the art that the ratio between the resistance values for resistors 230, 232 in the voltage divider network determines the peak to peak voltage values of the ramp generator output relative to the electrical source B+.

When the electrical supply voltage B+ increases, the voltage value provided to the negative input of comparator 216 is higher. The voltage value at the "high side" of resistor 230 is also increased. Resistor 230 is effectively connected to electrical supply B+ through the relatively small resistor 218. When the voltage B+ increases the "high side" of the voltage divider network 230, 232 increases. The operational amplifier 224 must, therefore, output a voltage values of greater and lesser magnitude to cause comparator 216 to switch states. As such, the peak-to-peak value of the ramp voltage is increased. The increase in supply voltage B+ increases both the slope and amplitude of the ramp signal. Since the switching voltages of the comparator 216 are also adjusted accordingly, the frequency of the ramp remains constant.

The pulse-width-modulator 160 provides a pulse-width-modulated current command signal to a phase select and control circuit 166. The torque command and direction signal 145 is also connected to the phase select and control circuit 166 of motor drive control 151 for the purpose of controlling motor direction. Phase select logic function 166 determines which pair of stator poles Aa, Bb, Cc or Dd are to be energized, based upon the torque command and direction signal.

As mentioned, it is assumed that stator pole Aa is to be energized. To energize stator winding Aa 149, motor drive control 151 provides a PWM output signal through controller terminal 84 to solid state switching device 72 and another PWM output signal through controller terminal 102 to solid state switching device 98.

Figure 6:
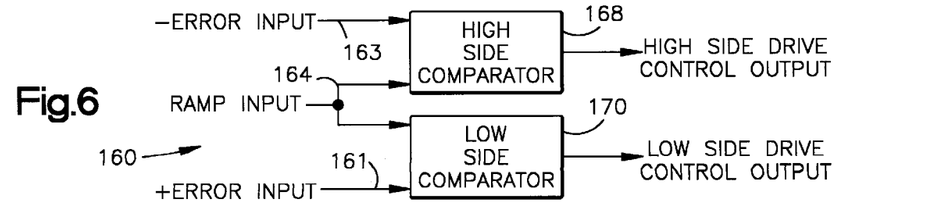
FIG. 6 is a schematic block diagram of a portion of the motor drive controller shown in FIG. 4.
Figure 7:
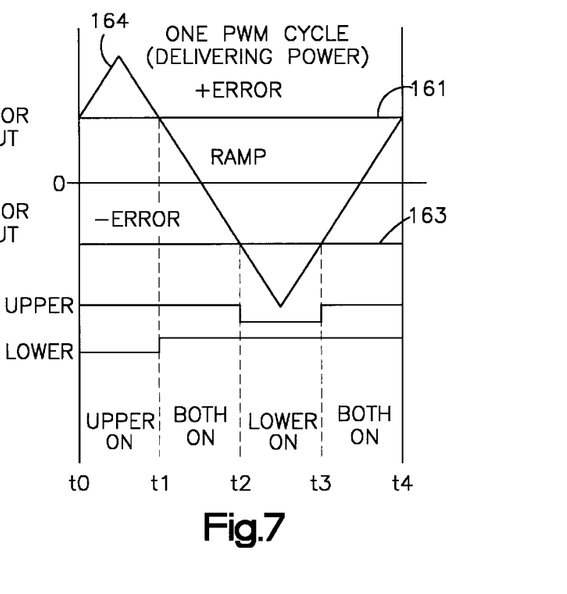
FIG. 7 is a graphical representation of a PWM cycle during an energization portion of a cycle.

Referring to FIGS. 6 and 7, the operation of the PWM circuit 160 of the motor drive control 151 will be better appreciated. The PWM circuit 160 provides thermal management and duty cycle control of the power switch module 40 when the power switch module 40 is operated to deliver power to the motor winding Aa 149. For drive current to be applied from the +12 volt source, i.e., the vehicle battery, to the motor winding 149, both switching elements 72 and 98 must be switched ON by motor drive control 151. If only one of the switching elements 72, 98 is ON, drive voltage is not applied to the winding. Motor drive controller 151 determines when switch elements 72, 98 are switched ON by comparing the value of ramp signal 164 to error signals 161, 163.

Ramp generator 162 provides ramp signal 164 as one input to (i) a HIGH-side comparator 168 and, (ii) a LOW-side comparator 170 of the PWM circuit 160. Error amplifier 156 provides minus error signal 163 as a second input to HIGH-side comparator 168. When the value of the ramp signal 164 is less than the value of the minus error signal 163, the upper or HIGH-side switch element 72 is OFF. When ramp signal 164 is greater than minus error signal 163, upper switch element 72 is ON. Error amplifier 156 provides plus error signal 161 as a second input to LOW-side comparator 170. When ramp signal 164 is greater than plus error signal 161, the lower switch element 98 is OFF. When ramp signal 164 is less than plus error signal 161, lower switch element 98 is ON.

Referring specifically to FIG. 7, control of switch elements 72 and 98 during one PWM cycle while motor drive control 151 is delivering power to motor winding Aa 149 will be better appreciated. At time to, ramp signal 164 is greater than minus error signal 163 and upper switch element 72 is ON. Ramp signal 164 is greater than plus error signal 161 and lower switch element 98 is OFF. In this time period from $t_0$ to $t_1$, the motor field is collapsing and any fly-back current in the motor winding Aa 149 will circulate through diode 96 and upper switch element 72. At $t_1$, ramp signal 164 becomes greater than minus error signal 163 and upper switch element 72 remains ON. Ramp signal 164 becomes less than plus error signal 161 and lower switch element 98 is switched ON. When both switch elements 72, 98 are ON, drive voltage is applied to winding Aa 149 and motor torque is generated. At time $t_2$, ramp signal 164 is less than minus error signal 163 and upper switch element 72 is switched OFF. Ramp signal 164 is less than plus error signal 161 and lower switch element 98 remains ON. In this state, the motor magnetic field is collapsing and any fly-back current in the motor winding Aa 149 will circulate through diode 88 and lower switch element 98. At time $t_3$, ramp signal 164 is greater than minus error signal 163 and upper switch element 72 is switched ON. Ramp signal 164 is less than plus error signal 161 and lower switch element 98 remains ON. Since both switch elements 72, 98 are ON, drive voltage is applied to winding Aa 149 and motor torque is again generated.

The percentage of time, during one PWM cycle, that both switches 72, 98 are concurrently ON is referred to as the winding PWM duty cycle. Each switching element 72, 98 has an individual switch duty cycle which is less than one hundred percent of the time period of one PWM cycle. As an example of the different duty cycles, assume that the time periods between $t_0$–$t_4$ in FIG. 7 are equal time periods. It can be seen that the winding PWM duty cycle is approximately fifty percent since during periods $t_1$–$t_2$ and $t_3$–$t_4$ both switching elements are ON. The switch duty cycle for switching element 72 is seventy-five percent since switching element 72 is ON during periods $t_0$–$t_1$, $t_1$–$t_2$ and $t_3$–$t_4$. The switch duty cycle for switching element 98 is also seventy-five percent since switching element 98 is ON during periods $t_1$–$t_2$, $t_2$–$t_3$ and $t_3$–$t_0$. The winding duty cycle is a function of the overlapping time periods of the individual switch duty cycle. The individual switch duty cycles of switching elements 72, 98 are a function of the command error signal. The ON time for either switching element will always be less than 100 percent of the PWM cycle if the system is operating correctly.

It will be appreciated that when the applied drive current, sensed by sense resistor 90 equals the current command signal, the command error signal 153 stabilizes. As can be seen in FIG. 7, the time spent in the fly-back periods is divided between the upper switching element 72 and lower switching element 98. Alternating the fly-back current loops between the loop including the upper or lower switching element provides more even thermal management between the switching elements.

Figure 8:
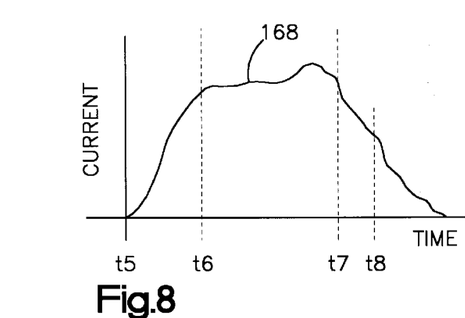
FIG. 8 is a graphical illustration of a stator winding current profile during an energization cycle.

Referring to FIG. 8, a current profile 168 is shown for a variable reluctance motor winding Aa 149 illustrating the change in motor winding current over a period of time. During the period between $t_5$ and $t_6$, motor winding Aa 149 is beginning to be energized and current is supplied to the motor winding thereby establishing a magnetic field in motor winding Aa 149. From $t_6$ to $t_7$, the motor drive current is producing the desired torque. Near the end of the energization time period, the current level is increased to maintain a constant torque. The PWM cycle shown in FIG. 7 controls switch elements 72 and 98 during one PWM cycle while motor drive control 151 is delivering power, from $t_0$ to $t_7$, to motor winding Aa 149. A large number of PWM cycles is required to make the current profile of FIG. 8.

Once motor winding Aa 149 has provided the required torque, phase select and control circuit 166 controls the power switch module 40 so as to energize the next desired stator windings, depending on the required torque and direction. At time $t_7$, delivery of electrical energy to motor winding Aa 149, by application of drive current to motor winding Aa 149, is interrupted or decreased. Resistive losses begin to consume the current in one of the fly-back diode and switch element loops as described above. However, there is little resistance in the motor stator winding Aa 149 and little power is dissipated.

In an inductive load, such as a motor winding of a variable reluctance motor, current can not be changed instantly, as shown by the following fundamental equations:

$$E = L\frac{di}{dt} \quad (1)$$

which can be rewritten as, $$\frac{E}{L} = \frac{di}{dt} \quad (2)$$

The inductive properties of motor winding Aa 149 follow the principles described in equations 1 and 2. As drive current and voltage is removed from the motor winding, the winding resists a change in inductive current. During this period, the motor functions as a generator and the polarity of the motor winding reverses due to the collapsing magnetic field. The collapsing magnetic field begins to develop a back Electro-Motive Force ("back EMF") in stator winding Aa 149. The voltage produced by the back EMF has the opposite polarity of that voltage developed across the winding when power is being delivered to the winding Aa. For example, when electrical power is delivered to motor winding Aa 149 by having both switching devices 72, 98 ON, approximately +12 volts is applied at the "A" side of the winding. When power is removed from the motor winding Aa 149 when one of the switching devices 72, 98 are switched OFF, approximately +12 volts is apparent at the "a" side of the winding. The actual value of the voltage at the windings will depend on the circuit elements.

Consistent with the above equations, the voltage across the inductive load will rise to any level necessary to maintain the instant current level. Referring to Equation 2, given that the value of the inductor L is constant, it can be seen that the time required to reduce the inductor current to zero is functionally related to the voltage seen at the terminal of the inductor. It will take longer for the current in winding Aa 149 to decrease to zero if 1 volt is applied at the terminals of winding Aa 149 than if 12 volts are applied to the terminals of winding Aa. In other words, the larger the voltage the inductor must overcome to maintain the current, the greater the change in current with respect to time and the sooner the current is reduced to zero. The sooner the current is reduced to zero, the less residual torque must be over come in the newly energized stator windings to maintain constant torque.

It will be appreciated that any residual current in the motor winding Aa, when it is not a desired torque producing winding, interferes with production of the desired motor torque in the other stator windings Bb, Cc, and Dd. Therefore, to achieve efficient reduction of winding current, the back EMF, which resists the change of current in the stator winding Aa, can be used to efficiently reduce inductor current by returning the current to the +12 volt source.

Figure 9:
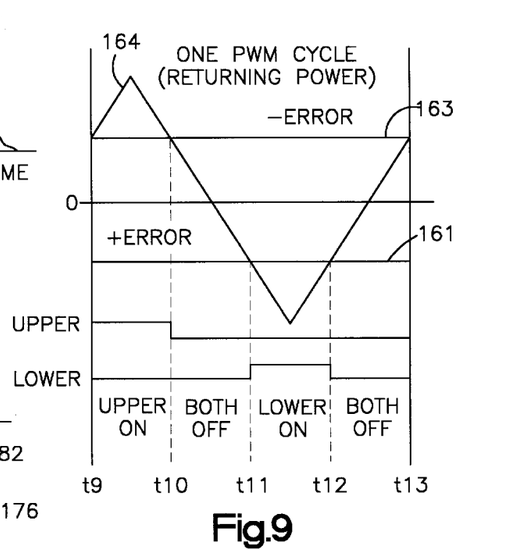
FIG. 9 is a graphical representation of a PWM cycle during a non-energizing portion of a cycle.

Referring to FIGS. 4 and 9, control of switch elements 72 and 98 for the return of stored energy to the battery will be better appreciated. FIG. 9 depicts one PWM cycle when motor drive control 151 is returning energy to the vehicle battery. The energy that is being returned is that energy that results from the collapsing magnetic field of motor winding Aa 149 after $t_8$ in FIG. 8. The PWM frequency is preferably 20 KHz. Therefore, there are a large number of PWM cycles that make up the current profile curve of FIG. 8. When the magnetic field collapses, the back EMF impressed across motor winding Aa 149 results in a voltage value having a polarity across motor winding Aa that is opposite that which occurs during the delivery of drive current. During such occurrence, the motor is acting as a "generator". When the winding is acting as a "generator", there is current flow in motor winding Aa 149.

During this stage of the current cycle, the summation of the filtered current command signal (the positive input of summing circuit 155) and the output from the current sense amp 158 (the negative input of summing circuit 155) results in a negative command error signal 153. As a result of the negative command error signal 153, the plus error signal 161 has an algebraically negative value and becomes the lower error signal in FIG. 9. The minus error signal 163 has a positive algebraic value and becomes the upper error signal in FIG. 9. The voltage comparison shown by the comparators 168, 170 (FIG. 6) provide the desired control of the fly-back current.

Referring to FIG. 9, at time $t_9$, ramp signal 164 is greater than minus error signal 163 and upper switch element 72 is ON. Ramp signal 164 is greater than plus error signal 161 and lower switch element 98 is OFF. In this state, any fly-back current in the motor winding Aa 149 will circulate through diode 96 and upper switch element 72. At $t_{10}$, ramp signal 164 becomes less than the value of the minus error signal 163 and upper switch element 72 is switched OFF. Ramp signal 164 is greater than the value of the plus error signal 161 and lower switch element 98 remains switched OFF. Both switch elements 72, 98 are switched OFF and fly-back current is flowing through diode 88 to winding Aa 149 and through diode 96 to the positive voltage supply. As described above, the polarity of the inductive current through winding Aa 149 when the switches are switched OFF is opposite that during power delivery. By applying 12 volts to the cathode of diode 96, the voltage to be overcome by the magnetic field of winding Aa is 12 volts plus the voltage drop across diode 96 and the voltage drop across diode 88. In the present invention, Schottky diodes rated for an approximately 0.4 volt drop across the diode are preferably used, thereby making the total voltage appearing across the winding be equal to approximately 12.8 volts. The reversed inductor polarity has the +12.8 volts at the "a" winding of motor winding Aa 149. The +12.8 volts at the anode of diode 96 forward biases the diode allowing current to flow through the diode and return power to the +12 volt supply, i.e., to the battery. This quickly reduces the inductor current to zero.

At time $t_{11}$, the value of the ramp signal 164 is less than the value of the minus error signal 163 and upper switch element 74 remains OFF. The value of ramp signal 164 is less than plus error signal 161 and lower switch element 98 is switched ON. In this state, any fly-back current in motor winding Aa 149 will circulate through diode 88 and lower switch element 98.

At time $t_{12}$, the value of the ramp signal 164 is less than the value of the minus error signal 163 and upper switch element 72 remains OFF. The value of the ramp signal 164 is greater than the value of the plus error signal 161 and the lower switch element 98 is switched OFF. When both of the switch elements 72, 98 are switched OFF, the return current is applied to winding Aa 149 and also is returned to the battery as described above.

Figure 11:
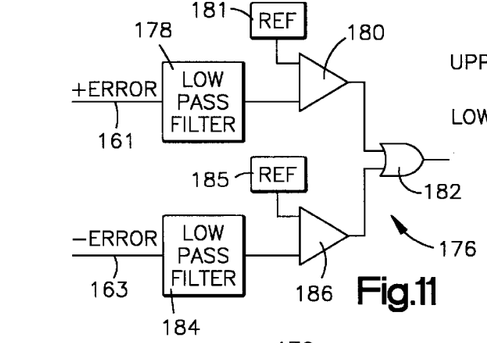
FIG. 11 is a schematic block diagram of the fault detector circuit shown in FIG. 10.

Referring to FIGS. 10 and 11, the fault detection features of the present invention will be better appreciated. The output of current sense amplifier 158 is connected to an input of a limit detect circuit 170. The value of the current sense amplifier output is compared against a predetermined threshold or reference value. When the value of the current sense amplifier output exceeds the predetermined reference value, the limit detect circuit provides a signal indicative thereof to relay 42 to open a relay driver 174. Relay driver 174 latches the occurrence of the error and de-energizes relay 42. Also, the output of the limit detect circuit is connected to an indicator 172 to warn the vehicle operator of a failure of the electric assist system. The indicator 172 would also be latched upon the occurrence of an error. The failure of the system can also be stored in a non-volatile memory for retrieval during routine maintenance by a technician.

The two outputs of the error amplifier 156 are connected to a fault detector circuit 176. The output of the fault detector circuit 176 is connected to indicator function 172 and to the relay driver 174. Referring to FIG. 11, the operation of the fault detector circuit 176 will be better appreciated. Error amplifier 156 provides error signals 161, 163 as inputs to fault detect circuit 176. Plus error signal 161 is connected to a low pass filter 178. In a preferred embodiment, low pass filter 178 passes signals having a frequency less than 1–10 Hz. The output of low pass filter 178 is connected to one input of a comparator 180. A reference voltage 181 is connected to the other input of comparator 180. The value of the reference voltage 181 is equal to the positive peak value from the ramp signal 164. When plus error signal 161 is greater than the reference voltage 181, comparator 180 outputs a digital HIGH to an OR gate 182. Minus error signal 163 is connected to a low pass filter 184. In a preferred embodiment, low pass filter 184 passes signals having a frequency less than 1–10 Hz. The output of low pass filter 184 is provided as one input to a comparator 186. A reference voltage 185 is connected to the other input of comparator 186. The value of the reference voltage 185 is equal to the negative peak value from the ramp signal 164. When minus error signal 163 is less than the negative reference voltage 185, comparator 186 provides a digital HIGH to OR gate 182. Approximately half of each freewheeling period, of each PWM cycle is spent in the upper leg (switch 72 and diode 96) while approximately half is spent in the lower leg (switch 98 and diode 88). Therefore, any fault occurring which has the equivalent effect of holding a solid state switching device ON, when the switching device should not be ON, increases the winding PWM duty cycle and causes currents to flow in the motor winding that were not being commanded. As a result, the error signal increases toward the peak value of ramp signal 164 exceeding one of the reference values 181, 185.

In an alternative embodiment, the error signal 161, 163 is filtered through low pass filters 178, 184. The filtered error signals are compared to the command signal using a window comparator. If the filtered error has a break point at about one-tenth of the motor commutation frequency, an error above a properly scaled command would indicate a fault. This fault is detected in the comparator by a change in output states.

When the output of the OR gate 182 is HIGH, a fault condition exists and the detector circuit 176 provides a signal indicative thereof to the relay 42 and the indicator 172. The error would be latched in relay driver 174 to keep relay 42 de-energized.

Figure 12:
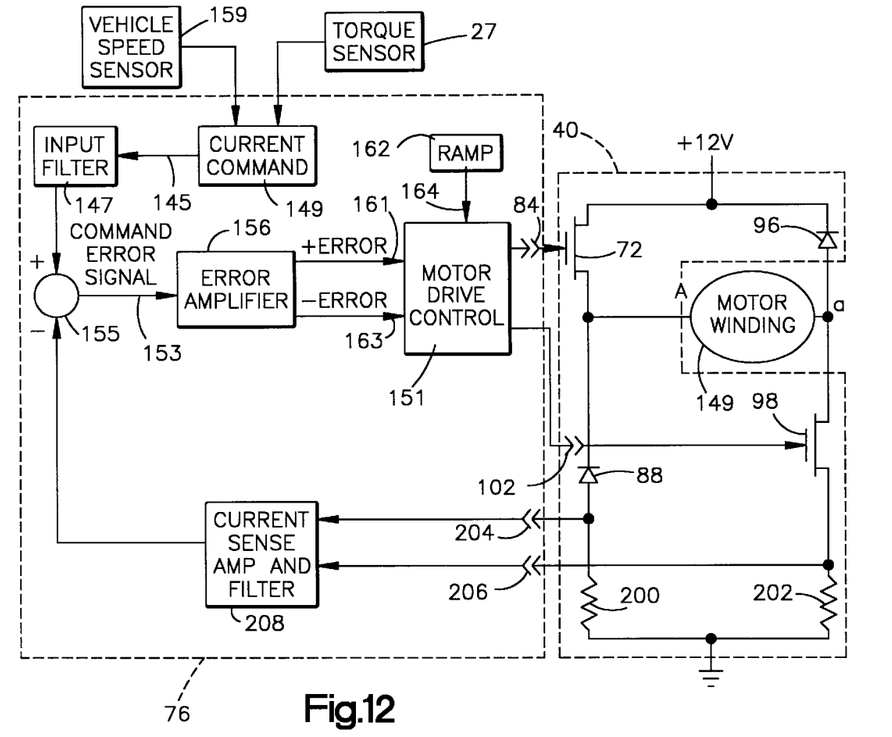
FIG. 12 is a schematic block diagram of an alternate embodiment of a portion of the system of FIG. 1.

Referring to FIG. 12, an alternate embodiment of the present invention is shown. One terminal of a current sense resistor 200 is electrically connected to the anode of diode 88 and to a test voltage terminal 204. Test voltage terminal 204 provides voltage values as one input to a current sense amplifier and filter 208. The other terminal of current sense resistor 200 is connected to electrical ground. One terminal of a current sense resistor 202 is electrically connected to the source of switching device 98 and to a test voltage terminal 206. Test voltage terminal 206 provides voltage values as a second input to current sense amplifier and filter 208. The other terminal of current sense resistor 202 is connected to electrical ground.

Referring to FIG. 7, the operation of the alternate embodiment shown in FIG. 12 will be better appreciated. At time $t_{10}$, ramp signal 164 is greater than minus error signal 163 and upper switch element 72 is ON. Ramp signal 164 is greater than plus error signal 161 and lower switch element 98 is OFF. In this state, any fly-back current in the motor winding Aa 149 will circulate through diode 96 and upper switch element 72 and the sensed current by current sense resistors 200, 202 is zero. At $t_1$, ramp signal 164 is greater than minus error signal 163 and upper switch element 72 is ON. When ramp signal 164 is less than plus error signal 161, lower switch element 98 is switched ON. When both switch elements 72, 98 are switched ON, drive current is applied to winding Aa 149 and torque assist is provided. The actual current flowing through motor winding Aa 149 is sensed by current sense resistor 202. At time $t_2$, ramp signal 164 is less than minus error signal 163 and upper switch element 74 is OFF. When ramp signal 164 is less than plus error signal 161, lower switch element 98 is switched ON. In this state, any fly-back current in the motor winding Aa 149 will circulate through diode 88 and lower switch element 98. The fly-back current is sensed by both sense resistors 200, 202 thereby providing a value indicative of two times the actual circulating motor fly-back current. At time $t_3$ ramp signal 164 is greater than minus error signal 163 and upper switch element 72 is ON. When ramp signal 164 is less than plus error signal 161, lower switch element 98 is switched ON. Both switch elements 72, 98 are switched ON and drive current is being applied to winding Aa 149 and generating torque. The current flowing through motor winding Aa 149 is sensed by current sense resistor 202.

During one PWM cycle as shown in FIG. 7, current sense amplifier and filter 208 has three different voltage values indicative of motor current provided by test voltage terminals 204, 206 (i) no test voltage is provided, indicating no current flow, when the fly-back current is circulating in the upper circuit loop including switching device 72 and diode 96, referred to hereinafter as the "0 term" (ii) when both switching devices 72, 98 are ON only current sense resistor 202 provides a test voltage value indicating the actual motor current flowing referred to hereinafter as the "1 term" and, (iii) both current sense resistors 200, 202 provide test voltage values indicating double the actual motor current flowing when the fly-back current is circulating in the lower circuit loop including switching device 98 and diode 88, referred to hereinafter as the "2 term".

As described above, the time period that the fly-back current circulates in the upper circuit loop, the 0 term, is approximately equal to the time period that the fly-back current circulates in the lower circuit loop, the 2 term. These time periods when fly-back current is circulating may be referred to as the OFF states of a PWM cycle. The average sensed current flow during these two OFF states is approximately equal to the actual current.

The sensed current during the ON state of a PWM cycle is equal to the actual current. The average current of a PWM cycle, obtained by averaging the 0, 1, and 2 terms described above, is approximately equal to the actual current flow during a PWM cycle.

Current sense amplifier and filter 208 includes a low pass filter. One skilled in the art will appreciate that a low pass filter may be designed which provides the necessary averaging of the 0, 1, and 2 terms to provide an average output indicative of the actual current flow during a PWM cycle. The 0, 1, 2 term topology permits the use of sense resistors in lower legs of H-bridge circuits without the need to switch in or out the desired sense resistor. This arrangement reduces current spikes and discontinuities when a sense resistor is switched in or out of the circuit.

Those skilled in the art will appreciate that the controller 76 may be embodied using discrete circuitry, a microcomputer, or an application specific integrated circuit ("ASIC"). If a microcomputer is used, the above-described functions would be accomplished through software algorithms.

It will also be appreciated that other waveforms having different slopes and characteristics may be used to provide ramp signal 164.

From the above description of the invention, those skilled in the art will perceive improvements, changes and modifications. Such improvements, changes and modifications within the skill of the art are intended to be covered by the appended claims.

Having described the invention, the following is claimed:

1. An apparatus for controlling an electric motor comprising:
   a first switching device operatively coupled between one terminal of said electric motor and a first terminal of a source of electrical energy;
   a second switching device operatively coupled between a second terminal of said electric motor and a second terminal of said source of electrical energy; and
   control means for controlling energization of said electric motor, said control means including means for periodically switching both said first and second switching devices between ON and OFF conditions during a motor commutation period, the switching period of said first and second switching devices being less than the motor commutation period and each said first and second switching devices having more than one ON condition during the motor commutation period and only a portion of each of the ON conditions of the first and second switching devices overlap during the switching period, electrical current flows through said electric motor during each overlap portion of the ON conditions and power dissipation switching losses are shared by both said first and second switching devices, the amount of the ON condition overlap controlling current in said electric motor, said control means including means for controlling said ON condition overlap.

2. The apparatus of claim 1 further including a first fly-back diode connected between said second motor terminal and said first terminal of said source of electrical energy and a second fly-back diode connected between said first motor terminal and said second terminal of said source of electrical energy.

3. The apparatus of claim 2 further including a first current sensing resistor connected between said second flyback diode and said second terminal of said source of electrical energy and a second current sensing resistor connected between said second switching device and said second terminal of said source of electrical energy.

4. An apparatus of claim 2 wherein said control means includes means for pulse-width-modulating each of said first and second switching devices with the period of each pulse-width-modulation being less thin the motor commutation period.

5. The apparatus of claim 4 wherein said control means includes ramp generating means for providing a periodic ramp signal having a period less than the motor commutation period, means for comparing said ramp signal against first and second error reference signals, means for sensing current through said electric motor and providing a signal indicative thereof, means for controlling the value of said first and second error reference signals in response to said sensed current, said means for pulse-width-modulating each of said first and second switching devices being response to said comparison.

6. The apparatus of claim 5 wherein each said first and second switching devices are periodically in an OFF state in response to said comparison during a PWM cycle and the time period of the OFF states during a PWM cycle is equally shared between said first and second switching devices.

7. The apparatus of claim 1 wherein said control means includes means for periodically switching said first and second switching devices between ON and OFF conditions so that the ON condition of the first and second switching devices does not overlap.

8. The apparatus of claim 1 further including current monitoring means for monitoring current through said motor and means for providing an error signal if excess current is sensed.

9. An apparatus for controlling a multiphase electric motor comprising:
   a first switching device operatively coupled between one terminal of a phase of said electric motor and a first terminal of a source of electrical energy;
   a second switching device operatively coupled between a second terminal of said phase of said electric motor and a second terminal of said source of electrical energy; and
   control means for controlling said electric motor including means for periodically switching said first and second switching devices between ON and OFF conditions so that no portion of the ON conditions of the first and second switching devices overlap and so that each of said first and second switching devices have more than one ON condition during a commutation period of said phase of said electric motor.

10. The apparatus of claim 9 further including a first fly-back diode connected between said second motor terminal and said first terminal of said source of electrical energy and a second fly-back diode connected between said first motor terminal and said second terminal of said source of electrical energy.

11. The apparatus of claim 10 wherein said control means includes means for pulse-width-modulating each of said first and second switching devices, the period of each pulse-width-modulation being less than the motor commutation period.

12. The apparatus of claim 11 wherein said control means includes ramp generating means for providing a periodic ramp signal having a period less than the motor commutation period, means for comparing said ramp signal against first and second error reference signals, means for sensing current through said electric motor and providing a signal indicative thereof, means for controlling the value of said first and second error reference signals in response to said sensed current, said means for pulse-width-modulating each of said first and second switching devices being response to said comparison.

13. The apparatus of claim 12 wherein each said first and second switching devices are periodically in an ON state in response to said comparison during a PWM cycle and the time period of the ON states during a PWM cycle is equally shared between said first and second switching devices.

14. An apparatus for controlling an electric assist steering system having an electric assist motor operatively connected to a steerable member, energization of said motor providing steering assist to said steering member, said apparatus comprising:
   torque sensing means for sensing applied steering torque and providing a torque signal indicative thereof;
   a first switching device operatively coupled between one terminal of said electric assist motor and a first terminal of a source of electrical energy;
   a second switching device operatively coupled between a second terminal of said electric assist motor and a second terminal of said source of electrical energy; and
   control means for controlling energization of said electric assist motor, said control means including means for periodically switching said first and second switching devices between ON and OFF conditions during a motor commutation period, the switching period of said first and second switching devices being less than the motor commutation period and each said first and second switching devices having more than one ON condition during the motor commutation period and only a portion of each of the ON conditions of the first and second switching devices overlap during the switching period, electrical current flows through said electric assist motor during each overlap portion of the ON conditions and power dissipation switching losses are shared by the first and second switching devices, the amount of the ON condition overlap controlling current in said electric assist motor, said control means including means for controlling said ON condition overlap in response to said sensed applied steering torque.

15. The apparatus of claim 14 wherein said control means includes means for pulse-width-modulating both said first and second switching devices between said ON and OFF conditions with the period of each pulse-width-modulation being less than the motor commutation period.

16. The apparatus of claim 14 wherein said electric assist motor is a variable reluctance motor.

17. The apparatus of claim 14 further including a first fly-back diode connected between said second motor terminal and said first terminal of said source of electrical energy and a second fly-back diode connected between said first motor terminal and said second terminal of said source of electrical energy.

18. The apparatus of claim 17 wherein said control means includes means for pulse-width-modulating each of said first and second switching devices with the period of each pulse-width-modulation being less than the motor commutation period.

19. The apparatus of claim 18 wherein said control means includes ramp generating means for providing a periodic ramp signal having a period less than the motor commutation period, means for comparing said ramp signal against first and second error reference signals, means for sensing current through said electric assist motor and providing a signal indicative thereof, means for controlling the value of said first and second error reference signals in response to said sensed current, said means for pulse-width-modulating each of said first and second switching devices being response to said comparison.

20. The apparatus of claim 19 wherein said control means further includes means for comparing said first and second error reference signal against first and second absolute reference values and means for disabling said electric assist system if either said first and second error reference signal exceed their associated first and second absolute reference values.

21. The apparatus of claim 19 where said control means further includes means for comparing said sensed current against a current threshold value and means for disabling said electric assist system if said sensed current exceeds said current threshold value.

22. A method for controlling an electric motor comprising the steps of:
 providing a first switching device operatively coupled between one terminal of said electric motor and a first terminal of a source of electrical energy;
 providing a second switching device operatively coupled between a second terminal of said electric motor and a second terminal of said source of electrical energy; and
 controlling energization of said electric motor by:
  (a) periodically switching said first and second switching devices between ON and OFF conditions during a motor commutation period so that the switching period of said first and second switching devices is less than the motor commutation period and each said first and second switching devices having more than one ON condition during the motor commutation period and only a portion of each of the ON conditions of the first and second switching devices overlap, electrical current flows through said electric motor during the overlap portion of the ON conditions, the amount of the overlap controlling current in said electric motor, and
  (b) controlling said overlap.

23. The method of claim 22 further including the step of providing a first current sensing resistor connected between said second flyback diode and said second terminal of said source of electrical energy and a second current sensing resistor connected between said second switching device and said second terminal of said source of electrical energy.

24. The method of claim 22 further including the step of providing a first fly-back diode connected between said second motor terminal and said first terminal of said source of electrical energy and providing a second fly-back diode connected between said first motor terminal and said second terminal of said source of electrical energy.

25. The method of claim 24 wherein said step of switching includes pulse-width-modulating each of said first and second switching devices with the period of each pulse-width-modulation being less than the motor commutation period.

26. The method of claim 25 wherein said step of controlling energization further includes providing a periodic ramp signal having a period less than the motor commutation period, comparing said ramp signal against first and second error reference signals, sensing current through said electric motor and providing a signal indicative thereof, controlling the value of said first and second error reference signals in response to said sensed current, and wherein said step of pulse-width-modulating includes pulse-width-modulating each of said first and second switching devices in response to said comparison.

27. The method of claim 26 wherein each said first and second switching devices are periodically in an OFF state in response to said comparison during a PWM cycle and the time period of the OFF states during a PWM cycle is equally shared between said first and second switching devices.

28. The method of claim 22 further comprising the step of controlling said electric motor by periodically switching said first and second switching devices between ON and OFF conditions so that the ON condition of each said first and second switching devices does not overlap.

29. The method of claim 22 further comprising the steps of sensing motor current and providing an error signal if excess current is sensed.

30. A method for controlling a multiphase electric motor comprising the steps of:
 providing a first switching device operatively coupled between one terminal of a phase of said electric motor and a first terminal of a source of electrical energy;
 providing a second switching device operatively coupled between a second terminal of said phase of electric motor and a second terminal of said source of electrical energy; and
 controlling said electric motor by periodically switching said first and second switching devices between ON and OFF conditions so that no portion of the ON conditions of each said first and second switching devices overlap and so that each of said first and second switching devices have more than one ON condition during a commutation period of said phase of said electric motor.

31. The method of claim 30 further including the step of providing a first fly-back diode connected between said second motor terminal and said first terminal of said source of electrical energy and providing a second fly-back diode connected between said first motor terminal and said second terminal of said source of electrical energy.

32. The method of claim 31 wherein said step of switching includes pulse-width-modulating each of said first and second switching devices with the period of each pulse-width-modulation being less than the motor commutation period.

33. The method of claim 32 wherein said step of controlling energization further includes providing a periodic ramp signal having a period substantially less than the motor commutation period, comparing said ramp signal against first and second error reference signals, sensing current through said electric motor and providing a signal indicative thereof, controlling the value of said first and second error reference signals in response to said sensed current, and wherein said step of pulse-width-modulating includes pulse-width-modulating each of said first and second switching devices in response to said comparison.

34. The method of claim 33 wherein each said first and second switching devices are periodically in an ON state in response to said comparison during a PWM cycle and the time period of the ON states during a PWM cycle is equally shared between said first and second switching devices.

35. A method controlling an electric assist steering system having an electric assist motor operatively connected to a steerable member, energization of said motor providing steering assist to said steering member, said method comprising the steps of:

sensing applied steering torque and providing a torque signal indicative thereof;

providing a first switching device operatively coupled between one terminal of said electric assist motor and a first terminal of a source of electrical energy;

providing a second switching device operatively coupled between a second terminal of said electric assist motor and a second terminal of said source of electrical energy; and controlling energization of said electric assist motor, by:
(a) switching said first and second switching devices between ON and OFF conditions during a motor commutation period, the switching period of said first and second switching devices being less than the motor commutation period and each of said first and second switching devices having more than one ON condition during the motor commutation period and only a portion of each of the ON conditions of the first and second switching devices overlap during the switching period, electrical current flows through said electric assist motor during each overlap portion of the ON conditions and power dissipation switching losses are shared by the first and second switching devices, the amount of the ON condition overlap controlling current in said electric assist motor, and
(b) controlling said ON condition overlap in response to said sensed applied steering torque.

36. The method of claim 35 wherein said step of switching includes pulse-width-modulating both said first and second switching devices between said ON and OFF conditions with the period of each pulse-width-modulation being less than the motor commutation period.

37. The method of claim 35 further including the steps of providing a first fly-back diode connected between said second motor terminal and said first terminal of said source of electrical energy and providing a second fly-back diode connected between said first motor terminal and said second terminal of said source of electrical energy.

38. The method of claim 35 further including the steps of providing a periodic ramp signal with the period of each pulse-width-modulation being less than the motor commutation period, comparing said ramp signal against first and second error reference signals, sensing current through said electric assist motor and providing a signal indicative thereof, controlling the value of said first and second error reference signals in response to said sensed current, and wherein said step of pulse-width-modulating includes pulse-width-modulating each of said first and second switching devices in response to said comparison.

39. The method of claim 38 further including the steps comparing said first and second error reference signal against first and second absolute reference values and disabling said electric assist motor if either said first and second error reference signal exceed their associated first and second absolute reference values.

40. The apparatus of claim 38 further including the steps of comparing said sensed current against a current threshold value and disabling said electric assist motor if said sensed current exceeds said current threshold value.

* * * * *

UNITED STATES PATENT AND TRADEMARK OFFICE
CERTIFICATE OF CORRECTION

PATENT NO. : 6,008,599
DATED       : December 28, 1999
INVENTOR(S) : Martin E. Beck It is certified that error appears in the above-indentified patent and that said Letters Patent is hereby corrected as shown below:

Column 17, line 27, change "thin" to --than--

Column 17, line 38, change "response" to --responsive--

Column 18, line 24, change "response" to --responsive--

Column 19, line 24, change "response" to --responsive--

Signed and Sealed this

Twenty-seventh Day of March, 2001

Attest:

NICHOLAS P. GODICI

Attesting Officer

Acting Director of the United States Patent and Trademark Office